Figure 1:
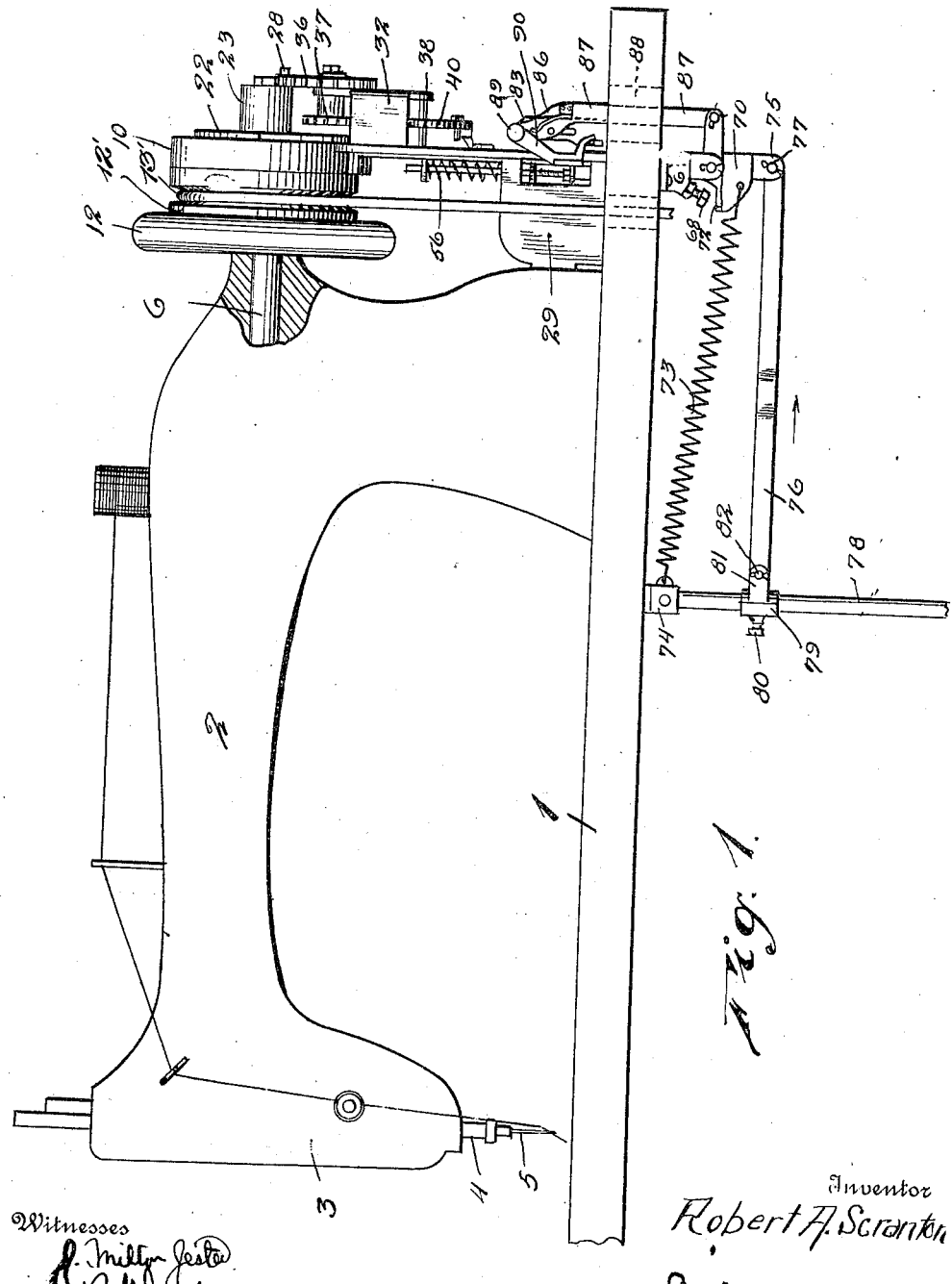

R. A. SCRANTON.
CLUTCH MECHANISM FOR SEWING MACHINES.
APPLICATION FILED APR. 11, 1912.

1,074,650.

Patented Oct. 7, 1913.
5 SHEETS—SHEET 1.

Witnesses

Inventor
Robert A. Scranton
By
C. L. Parker
Attorney

R. A. SCRANTON.
CLUTCH MECHANISM FOR SEWING MACHINES.
APPLICATION FILED APR. 11, 1912.
1,074,650.
Patented Oct. 7, 1913.
5 SHEETS—SHEET 2.
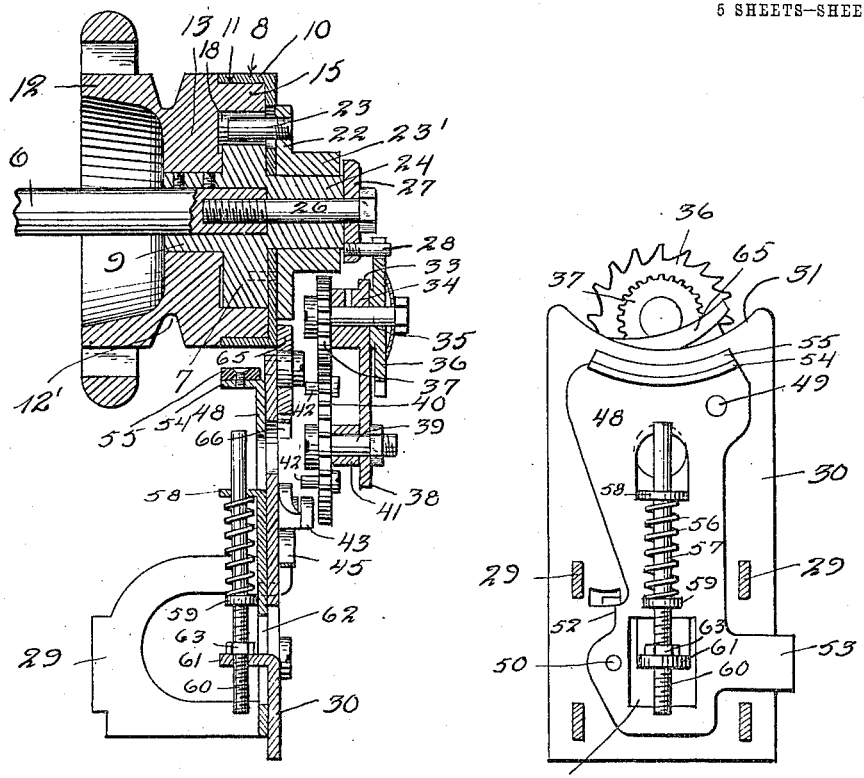
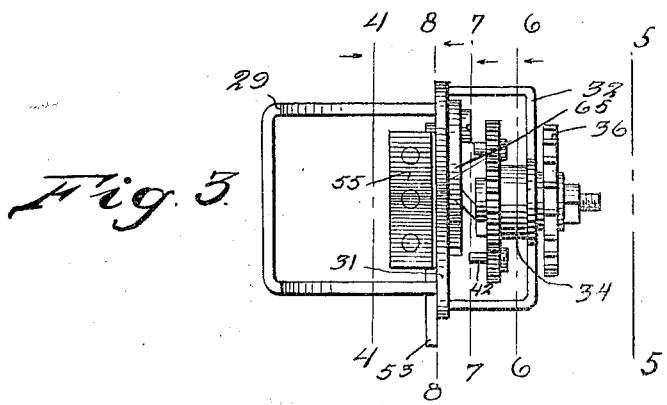
Witnesses
J. Milton Jester
B. F. Fishburn
Inventor
Robert A. Scranton
C. L. Parker
Attorney R. A. SCRANTON.
CLUTCH MECHANISM FOR SEWING MACHINES.
APPLICATION FILED APR. 11, 1912.

1,074,650.

Patented Oct. 7, 1913.
5 SHEETS—SHEET 3.

Witnesses
J. Milton Lester.
B. V. Milburne

Inventor
Robert A. Scranton
By C. L. Parker
Attorney

R. A. SCRANTON.
CLUTCH MECHANISM FOR SEWING MACHINES.
APPLICATION FILED APR. 11, 1912.

1,074,650.

Patented Oct. 7, 1913.
5 SHEETS—SHEET 4.

Witnesses
J. Milton Jester.
B. ......

Inventor
Robert A. Scranton

By C. L. Parker
Attorney

R. A. SCRANTON.
CLUTCH MECHANISM FOR SEWING MACHINES.
APPLICATION FILED APR. 11, 1912.

1,074,650.

Patented Oct. 7, 1913.

5 SHEETS—SHEET 5.

Witnesses
J. Milton Jester.
B.

Inventor
Robert A. Scranton
By
C. L. Parker
Attorney

UNITED STATES PATENT OFFICE.

ROBERT A. SCRANTON, OF NEW YORK, N. Y., ASSIGNOR, BY MESNE ASSIGNMENTS, TO THE IMPERIAL SEWING MACHINE COMPANY, A CORPORATION OF DELAWARE.

CLUTCH MECHANISM FOR SEWING-MACHINES.

1,074,650.  Specification of Letters Patent.  Patented Oct. 7, 1913.

Application filed April 11, 1912. Serial No. 690,197.

*To all whom it may concern:*

Be it known that I, ROBERT A. SCRANTON, a citizen of the United States, residing at New York, in the county of New York and State of New York, have invented certain new and useful Improvements in Clutch Mechanism for Sewing-Machines, of which the following is a specification.

The present invention relates to automatic means to periodically actuate clutch mechanism which normally affords an operative connection between driving and driven rotary elements and has particular reference to means of this character adapted for use in connection with power sewing machines, whereby the continuous rotary movement of the driving wheel may be employed for producing intermittent rotary motion of the operating shaft which drives the needle bar.

It is well known that in sewing on buttons a power sewing machine is equipped with a button holding and shifting device, which automatically shifts the button to bring the holes thereof in proper position so that the needle may pass through them and sew the button to the fabric. In sewing on the buttons in this manner it is necessary that the needle bar should be stopped after making a predetermined number of operations.

It is therefore an important object of this invention to provide means of the above mentioned character which will automatically stop the needle bar after it has made a predetermined number of movements.

A further object of the invention is to provide means of the above mentioned character, which operate automatically in a positive and reliable manner, so that the stopping of the machine is not at all dependent upon an attendant.

A further object of the invention is to provide means of the above mentioned character, which when operated, will quickly bring the moving parts of the sewing machine to a stop without jars or strains which would damage the machine.

A further object of this invention is to provide automatic clutch actuating means, which is simple in construction, cheap to manufacture, and positive in its operation.

A further object of this invention is to provide novel and conveniently operated means to reset the automatic means which actuates the clutch mechanism.

A further object of this invention is to provide means of the above mentioned character, which will first apply braking means to the driven rotary element, to retard and gradually decrease in rotary movement and subsequently disconnect the same from the driving rotary element and stop it in just the right position so that the needle will be elevated when it finally comes to rest.

Other objects and advantages of the invention will be apparent during the course of the following description.

Figure 5:
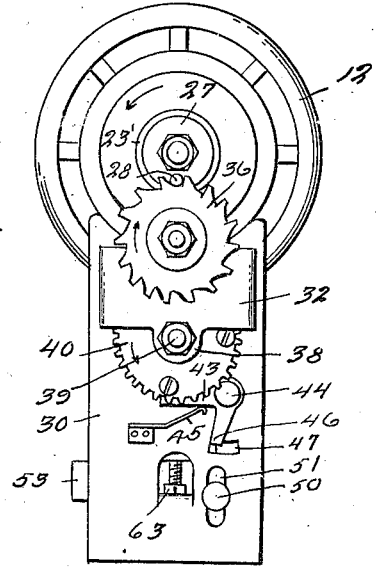
Figure 6:
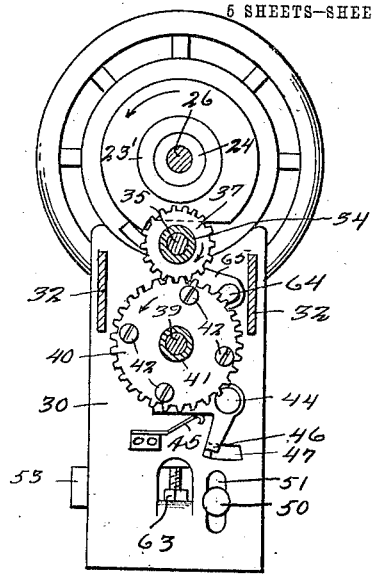
Figure 7:
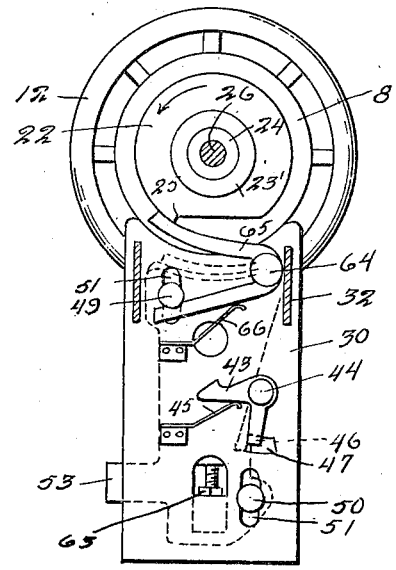
Figure 8:
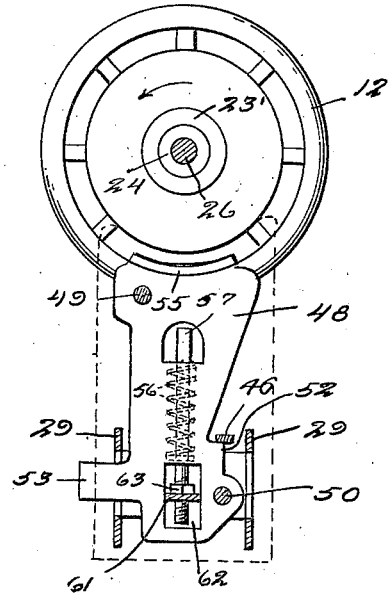
Figure 9:
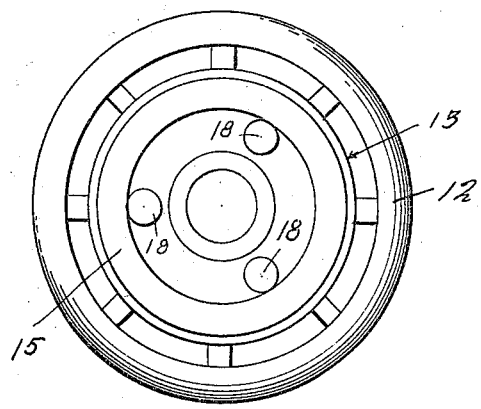
Figure 10:
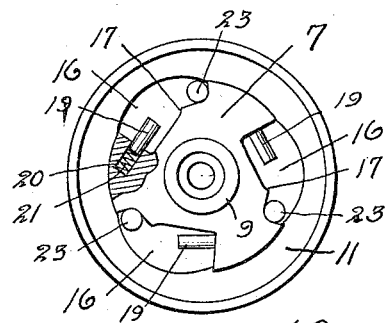
Figure 11:
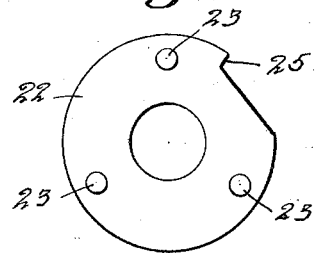
Figure 13:
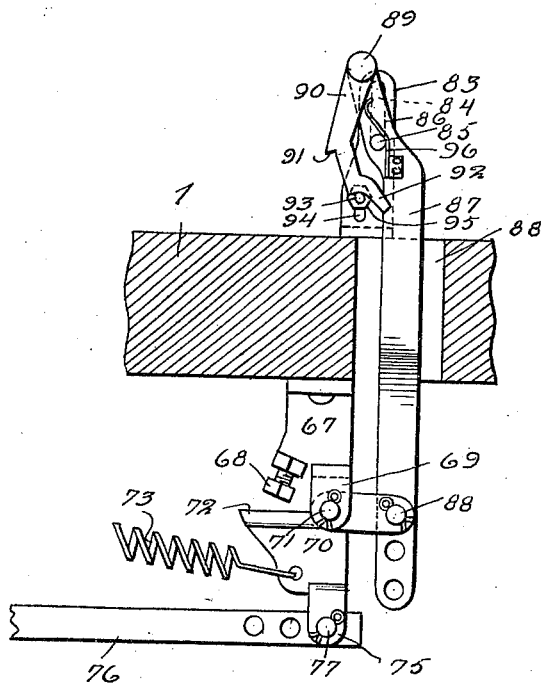
Figure 14:
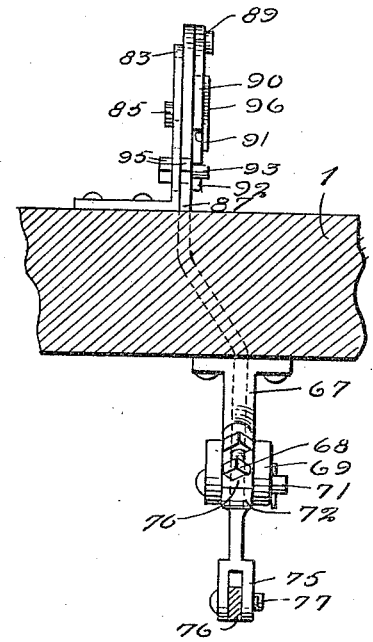
Figure 12:
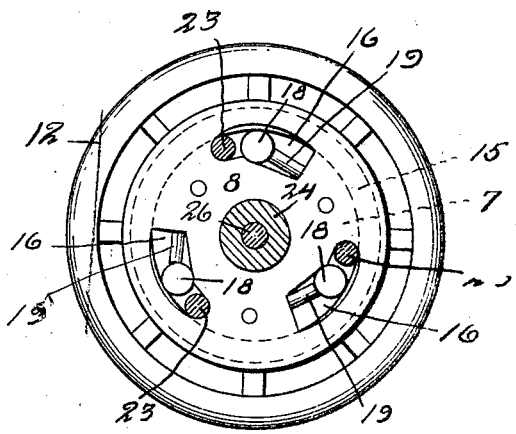

In the accompanying drawings forming a part of this specification and in which like numerals are employed to designate like parts throughout the same, Figure 1 is a side elevation of a sewing machine, showing my improved clutch actuating means applied thereto. Fig. 2 is a central vertical longitudinal sectional view through the driving and driven wheels or elements of the sewing machine and my improved clutch actuating means. Fig. 3 is a plan view of the clutch actuating means, parts being omitted. Fig. 4 is a transverse vertical sectional view taken on line 4—4 of Fig. 3 and looking in the direction of the arrow. Fig. 5 is a side elevation of the same, viewed from the line 5—5 of Fig. 3 and looking in the direction of the arrow. Fig. 6 is a vertical transverse sectional view taken on line 6—6 of Fig. 3 and looking in the direction of the arrow. Fig. 7 is a similar view taken on line 7—7 of Fig. 3 and looking in the direction of the arrow. Fig. 8 is a similar view taken on line 8—8 of Fig. 3 and looking in the direction of the arrow. Fig. 9 is a face view of the clamping flange carried by the driving element or wheel, showing the locking elements or rollers therein. Fig. 10 is an inner face view of the driven rotary element or wheel. Fig. 11 is a similar view of a shifting element or plate. Fig. 12 is an end view of the combined driving and driven rotary elements or wheels, the shifting plate being removed and the pins carried thereby shown in section. Fig. 13 is an enlarged side elevation of the upper end portion of the means for reseating the clutch actuating means, and Fig. 14 is an edge view of the same, taken at right angles to Fig. 13.

In the drawings wherein for the purpose of illustration, I have shown a preferred embodiment of my invention, the numeral 1 designates the base of a sewing machine, upon which is rigidly mounted a curved overhanging bracket-arm 2, provided at its forward end with a head or shell 3 containing the usual mechanism for reciprocating a needle bar 4, carrying a needle 5. Journaled through the upper portion of the bracket-arm 2 is a horizontal operating shaft 6, which drives the needle bar mechanism.

Rigidly mounted upon the operating shaft 6 is a driven rotary wheel or element comprising rigidly connected inner and outer parts 7 and 8. The inner part 7 is in the form of a cylindrical head and is clamped or otherwise mounted upon the operating shaft 6 so that it cannot turn thereon. Formed integral with this inner head 7 is a forwardly extending sleeve 9. The outer part 8 of the rotary driven element or wheel is in the form of a shell inclosing the inner head 7 and having an outer annular flange 10, which forms therewith an annular opening 11.

The numeral 12 designates a driving element or wheel, having a hub-portion 13, which is rotatably mounted upon the sleeve or extension 9, and has a groove 12' formed thereon for receiving a driving belt 13'. Formed integral with the hub portion 13 is an annular clamping or locking flange 15, which fits within the annular opening 11 and slidably engages the annular flange 10. The head 7 is provided in its periphery with openings 16, which have wedge-shaped portions formed by shoulders 17. Within these wedge-shaped portions of the openings 16 are disposed locking elements or rollers 18, which engage the inner walls of the openings 16 and the inner wall of the clamping annular flange 15. These locking elements or rollers are urged into engagement with the shoulders 17, by plungers 19, fitting within openings 20 and engaged by compressible coil springs 21 disposed therein. It is thus seen that when the driving element or wheel 12 is rotated in the direction of the arrow, it will cause the driven wheel or element to rotate with it, until the locking elements or rollers 18 are moved out of engagement with the shoulders 17 into the enlarged end portions of the openings 16, when the wheel 12 will continue to turn without turning the driven element or wheel. The means for thus moving or shifting the locking elements or rollers 18, comprises a preferably circular shifting plate 22, carrying pins 23 which extend within the contracted end portions of the openings 16. This shifting plate carries a central hub or ring 23' which is rotatably mounted upon a sleeve 24 formed integral with the head 7. It is thus seen that the rotating driving wheel 12 and driven wheel or element will be disconnected by holding the shifting plate 22 against rotation, it being understood that this shifting plate rotates with the driven element or wheel. The shifting plate 22 is provided upon its periphery with a cut-out portion forming a shoulder 25.

The operating shaft 6 is provided in one end with a screw-threaded opening, for receiving the screw-threaded inner end of a clamping screw 26, extending through the sleeve 24 and rigidly holding a plate 27 in engagement with the free end of the sleeve 24, such free end of the sleeve 24 extending beyond the sleeve 23', whereby the sleeve 23' and its shifting plate 22 are free to turn upon the sleeve 24. The plate 27 carries a lug or extension 28, as shown.

Automatic means are provided for holding the shifting plate 22 against rotation, when it is desired that the rotary driving and driven elements or wheels be disconnected. Such means comprise a lower securing frame 29, which is disposed near and above the base 1 and rigidly connected with the lower end of the bracket-arm 2. This securing frame is approximately U-shaped and has its end portions forked and rigidly connected with a main upstanding supporting plate 30. The supporting plate 30 has its upper end 31 cut in a curve to correspond to the curvature of the annular flange 10, the end 31 being placed below and suitably spaced from flange 10, as shown. Disposed upon the outer surface of the supporting plate 30 and rigidly connected with the upper end thereof is an approximately U-shaped frame or housing 32. The frame or housing 32 is provided upon its upper end with an upwardly extending ear 33, provided with a bearing 34, rotatably holding a shaft 35. This shaft 35 has a star or index wheel 36 rigidly connected therewith upon the outer face of the housing 32 and a small pinion 37 rigidly connected with its inner end and disposed within the housing 32. It is thus seen that the star or index wheel and the small pinion turn together. The frame or housing 32 is provided at its lower end with a depending ear 38, having rigid connection with an inwardly extending stub-shaft 39, upon which is rotatably mounted a large trip-pinion 40, provided with a hub or spacing sleeve 41. This large pinion engages with and is driven by the small pinion 37, as shown. The large pinion 40 is provided with a suitable number of spaced trips or extensions 42, which may be in the form of screws or the like. These trips are adapted to engage with a movable latch, in the form of a bell-crank lever 43, pivotally mounted upon the supporting plate 30, as shown at 44. The upper arm of this bell-crank lever latch is engaged by a spring 45, which is attached to the outer face of the supporting plate 30, as shown. The lower end of the bell-crank lever latch 43 is bent at right angles for forming a horizontal extension 130.

46, operating within an opening 47 formed in the supporting plate 30.

Slidably engaging the inner face of the supporting plate 30 is a reciprocatory brake-plate 48, preferably having the general shape, as shown. This brake-plate is provided near its upper and lower ends and upon opposite edges with guide pins 49 and 50, operating within vertical slots 51. Upon one edge, the brake-plate is provided with a shoulder 52, which is engaged by the lower horizontal portion 46 of the bell-crank lever 43. Upon its opposite edge the brake plate 48 is provided with a lug or ear 53. The brake-plate 48 is provided at its upper end with a curved shoe 54, carrying upon its upper face a strip of leather or other fibrous material 55. This brake shoe is movable into engagement with the flange 10 of the driven element or wheel. When the brake-plate 48 is released it is quickly moved upwardly by a compressible coil spring 56, which surrounds a portion of a shaft 57, the upper end of which extends through an apertured ear 58 stamped from the material of the brake-plate 48, as shown. The spring 56 has its upper end in engagement with the ear 58 and the lower end in engagement with an adjustable nut 59 disposed upon the lower screw-threaded portion 60 of the rod 57, such lower screw-threaded portion extending though an apertured ear 61 stamped from the supporting plate 30 and extending through an opening 62 formed in the brake-plate 48. The screw-threaded portion 60 of the shaft 57 carries a stop nut 63, as shown.

Pivotally mounted upon the outer face of the securing plate 30 and near the upper end thereof, as shown at 64, is a movable preferably substantially V-shaped holding element 65, the upper arm of which is adapted to move into engagement with the shoulder 25 of the shifting plate 22. The lower arm of the holding element 65 is engaged by the head of the guide pin 49. A leaf-spring 66 engages the lower arm of the holding element 65 and quickly swings the same upwardly when the holding element is released.

Secured to the lower face of the base 1 near the end thereof is a fixed bracket or support 67, provided with an adjustable stop 68 and having a lower forked end 69, for receiving a bell-crank lever 70. These parts are pivotally connected by a pin 71 or the like. The bell-crank lever 70 is provided with an extension or shoe 72 adapted to engage the stop 68. A retractile coil spring 73 has one end connected with the bell-crank lever 70 and its opposite end connected with a bracket or element 74 which is fixedly secured to the lower face of the base 1. The bell-crank lever 70 has its lower end 75 forked, as shown, for receiving one end of a reach rod 76, such parts being adjustably and pivotally connected by a pin 77 or the like.

The numeral 78 designates a depending swinging lever or rod, which is pivotally connected at its upper end with the fixed element 74. This lever 78 has a sleeve 79 longitudinally adjustably mounted thereon and held in adjustment at any desired position by a clamping bolt 80. This sleeve is provided with spaced ears 81, between which extends one end of the reach rod 76, these parts being pivotally connected by a pin 82 or the like.

Disposed near and spaced from the outer face of the supporting plate 30 is a stationary vertical guide bracket 83, fixedly secured to the upper face of the base 1. This guide bracket is provided through its upper portion with a longitudinally extending slot 84 for receiving a headed pin 85 carried by an upper angular end portion 86 of an upstanding rod 87, off-set intermediate its ends and extending through an opening 88 in the base 1. The lower end of the rod 87 is pivotally adjustably connected with one arm of the bell-crank lever 70 by a pin 88 or the like. Pivotally connected with the upper end of the angular end portion 86, as shown at 89, is a depending finger 90, provided with a shoulder 91 adapted for engagement with the lug or extension 53 of the brake plate 48. This depending finger has an inclined or angular end portion 92, to be engaged by a guide pin 93, which is longitudinally adjustably mounted in a slot 94 formed in the fixed bracket 83. Clamping nuts 95 are employed to securely hold the guide pin 93 in its adjusted position. It is thus seen that when the rod 87 is moved downwardly the finger 90 is also moved downwardly so that its shoulder will engage the extension 53 and return the brake-plate 48 to its normal starting position subsequently to which and upon further movement of the rod 87 in this downward direction the finger 91 is swung laterally so that its shoulder 91 disengages the extension 53. This lateral movement of the finger is caused by the angular end portion 92 thereof traveling in engagement with the guide pin 93, as is obvious.

The operation of the device is as follows: The driving wheel or element 12 is continuously rotated in the direction indicated by the arrow and the clutch mechanism normally connects the driving element with the driven element including the shell 8 so that they rotate together. Upon each rotation of the driving wheel 12 the lug 28 engages the star or index wheel 36 and advances it a step, which step by step movement is imparted to the pinions 37 and 40. The pinion 40 is rotated to bring one of the trips 42 into engagement with the latch 43, so that its lower horizontal portion 46 is moved out of engagement with the shoulder 52 of the brake plate. This brake plate is quickly moved by the spring 56 in an upward direction so that the brake shoe engages the flange 10 of the rotary driven element. The guide pin 49 has moved upwardly and the movable holding element 64 is free to be moved by the spring 45 when the driven rotary element has made about one more complete revolution. The different operating parts of the device are so adjusted that the brakes will be set just after the shoulder 25 has cleared the free end of the upper arm of the holding element 65, as clearly shown in Fig. 7. The driving and driven elements continue to rotate together and their speed is gradually reduced until they have completed almost another revolution, when the upper arm of the holding element will engage the shoulder 25 and hold the shifting plate 22 against movement, whereby the driving and driven elements are disconnected, as hereinabove described. It is thus seen that the rotary driven element is gradually brought to rest and disconnected from the rotary driving elements without undue shock or jar to the clutch mechanism or other parts of the device. The final stopping of the shifting plate 22 and driven rotary element is attained without undue jar or shock as the clutch mechanism is yieldable by virtue of the springs 21 thereof. When the upper arm of the holding element 65 engages the shoulder 25 it is obvious that the driven element or wheel cannot rotate any farther, whereby the operating shaft 6 will be brought to rest at just the right position, so that the needle 5 will be elevated, when such needle finally comes to rest. By swinging the lever 78 to the right, the rod 87 is moved upwardly to elevate the depending finger 90. The spring 96 now swings the finger 90 laterally so that its shoulder 91 will engage above the extension 53. The lever 78 is now released and the spring 73 quickly swings the bell-crank lever 70 to move the rod 87 downwardly. This movement of the rod 87 moves the depending finger 90 downwardly, which in turn moves the extension 53 downwardly so that the brake plate 48 is reset. Upon the further downward movement of the finger 90, the same is swung laterally to disengage the extension 53, which is caused by the angular extremity 92 thereof traveling in engagement with the guide pin 93. When this operation has been completed the clutch mechanism at once connects the driving and driven rotary elements.

The periodical stopping of the power driven sewing machine is necessary when sewing on buttons and the means hereinabove described are particularly designed for stopping the machine when used for this purpose. The sewing machine is equipped with mechanism (not shown) for holding and shifting the button to bring the different holes thereof into proper position below the needle.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus described my invention, I claim:—

1. The combination with a movable element, of a rod, a finger pivotally connected with the rod, a spring to move the finger into engagement with the movable element when the rod is in one position, means to move the finger out of engagement with the element when the rod is in another position, and means to move the rod.

2. The combination with a movable element, of a rod, a depending finger pivotally connected with the rod and having an extension to engage said element, said finger having an angular portion, a guide pin to engage the angular portion to swing the finger laterally, a spring for swinging said finger laterally, and means to move the rod.

3. The combination with a movable element, of a fixed guide bracket, a rod carrying means engaging said bracket, a depending finger pivotally connected with the rod and having a shoulder to engage said element and provided below the shoulder with an angular portion, a guide pin connected with the bracket to be engaged by said angular portion, a spring to move the finger in one direction, and means to move the rod.

4. In a device of the character described, driving and driven rotatable elements, clutch elements serving to normally rigidly connect the rotatable elements and capable of partaking of restricted movements in one direction with relation thereto, a shifting plate carrying pins engaging the clutch elements whereby said shifting plate is bodily rotatable with the driving rotatable element, a movable plate provided with a brake-shoe to engage the driven rotatable element, a latch to normally hold the movable plate against movement in one direction, a spring to quickly move the movable plate in one direction when released, a movable holding element adapted to engage the shifting plate to positively prevent its further rotation, means operated by the movable plate to prevent the movement of the holding element in one direction before said movable plate is released, and means operated by one of the rotatable elements to move the latch which normally holds said movable plate against movement.

5. In a device of the character described, driving and driven rotatable elements, clutch mechanism between the same, a supporting plate disposed near said rotatable elements, a movable brake-plate mounted upon one side of the supporting plate, a shifting plate bodily rotatable with one of the rotatable elements and carrying means to operate the clutch mechanism, a movable holding element mounted upon the opposite side of said supporting plate and adapted to engage the shifting plate, a bolt attached to the brake-plate and extending through an opening in the supporting plate to engage the holding element for controlling its operation, a spring to move the brake-plate in one direction, a spring to move the holding element in one direction, a latch to normally hold the brake-plate against movement in one direction, and means automatically driven by one rotatable element and timed in its operation to move said latch just after a certain portion of the shifting plate has passed the holding element.

6. In a device of the character described, driving and driven rotatable elements, clutch mechanism between the same, a supporting plate disposed near the rotatable elements, a movable brake-plate mounted upon one side of the supporting plate, a movable latch mounted upon the opposite side of the supporting plate and normally holding the brake-plate against movement, a spring to move said brake-plate in one direction when released, a shifting plate for operating the clutch mechanism, a holding element mounted upon the supporting plate and adapted to hold the shifting plate against movement and controlled in its operation by said brake-plate, a bracket mounted upon the supporting plate, a plurality of gears supported by the bracket, one of which is provided with means to operate the movable latch, and a star-wheel connected with one of the plurality of gears and intermittently moved by one rotatable element.

7. In a device of the character described, driving and driven rotatable elements, clutch mechanism between the same, a supporting plate disposed near the rotatable elements, a movable brake-plate mounted upon one side of the supporting plate, a shifting plate bodily rotatable with one of the rotatable elements and carrying means to operate the clutch mechanism, a holding element movably mounted upon the opposite side of the supporting plate and adapted to engage the shifting plate, means whereby said holding element is movable in one direction only when said brake-plate is moved in the same direction, a spring to quickly move the brake-plate in one direction, a latch to normally hold the brake-plate against movement by the spring, a plurality of gears one of which is provided with means to move the latch, a star-wheel connected with one of the gears, and means rotated by one rotatable element to intermittently drive the star-wheel.

8. In a device of the character described, driving and driven rotatable elements, clutch mechanism between the same, means to operate the clutch mechanism to disconnect the rotatable elements, a supporting plate disposed near the rotatable elements, a reciprocatory brake-plate and provided with an opening formed therethrough mounted upon the supporting plate, a tongue rigidly connected with the supporting plate and extending laterally through the opening formed in the brake-plate, an apertured tongue rigidly connected with said brake-plate, a rod adjustably connected with the tongue of the supporting plate and passing through the apertured tongue of the brake-plate, and a coil spring surrounding the rod and engaging the tongue of the brake-plate.

9. The combination with a movable element, of a movable rod, a movable finger connected with said rod, means to automatically move the finger into engagement with the movable element when said rod is in one position, and means to automatically move said finger out of engagement with the movable element when said rod is moved in one direction.

10. The combination with a fixed upstanding bracket, of a movable element disposed near the same, a reciprocatory rod provided with guide means which engage the upstanding bracket, a depending finger provided with means to engage the movable element and having an inclined lower portion, a stationary element connected with the upstanding bracket to engage the lower inclined portion of the finger when the same is moved in that direction, and means to move the reciprocatory rod.

In testimony whereof I affix my signature in presence of two witnesses.

ROBERT A. SCRANTON.

Witnesses:
ROSKA E. KITCH,
AUSTIN DONOR.